United States Patent [19]

Allen

[11] Patent Number: 5,265,937
[45] Date of Patent: Nov. 30, 1993

[54] SEAT BACK INERTIA LOCK

[75] Inventor: John J. Allen, St. Paul, Minn.

[73] Assignee: General Motors Corporation, Detroit, Mich.

[21] Appl. No.: 906,168

[22] Filed: Jun. 29, 1992

[51] Int. Cl.⁵ ............................................. B60N 2/02
[52] U.S. Cl. ......................... 297/378.11; 297/378.12
[58] Field of Search ........................................ 297/379

[56] References Cited

U.S. PATENT DOCUMENTS

| | | | |
|---|---|---|---|
| Re. 31,741 | 11/1984 | Strowick et al. | 297/367 |
| Re. 32,884 | 3/1989 | Kluting et al. | 297/367 |
| 3,628,831 | 12/1971 | Close | 297/379 |
| 3,679,259 | 7/1972 | Simonelli | 297/379 |
| 3,972,564 | 8/1976 | Arlauskas et al. | 297/378 |
| 4,082,353 | 4/1978 | Hollowell | 297/379 |
| 4,118,067 | 10/1978 | Tanaka | 297/379 |
| 4,165,128 | 8/1979 | Strowick et al. | 297/367 |
| 4,243,264 | 1/1981 | Bell | 297/367 |
| 4,252,370 | 2/1981 | Kluting et al. | 297/379 |
| 4,294,488 | 10/1981 | Pickles | 297/367 |
| 4,305,615 | 12/1981 | Osterhold | 297/379 |
| 4,318,569 | 3/1982 | Bilenchi et al. | 297/379 |
| 4,366,984 | 1/1983 | Klueting et al. | 297/379 |
| 4,429,919 | 2/1984 | Klueting et al. | 297/379 |
| 4,438,974 | 3/1984 | Kresky et al. | 297/379 |
| 4,579,384 | 4/1986 | Sharod | 297/113 |
| 4,579,387 | 4/1986 | Bell | 297/379 |
| 4,607,884 | 8/1986 | Heling | 297/341 |
| 4,634,182 | 1/1987 | Tanaka | 297/379 |
| 4,707,010 | 11/1987 | Croft et al. | 297/379 |
| 4,720,145 | 1/1988 | Bell | 297/379 |
| 4,733,912 | 3/1988 | Secord | 297/379 |
| 4,756,577 | 7/1988 | Berg et al. | 297/379 |
| 4,799,733 | 1/1989 | Beley et al. | 297/379 |
| 4,919,482 | 4/1990 | Landis et al. | 297/379 |
| 5,100,202 | 3/1992 | Hughes | 297/379 |
| 5,154,476 | 10/1992 | Haider et al. | 297/379 |

Primary Examiner—Peter M. Cuomo
Assistant Examiner—Michael J. Milano
Attorney, Agent, or Firm—William A. Schuetz

[57] ABSTRACT

An inertia responsive seat back lock mechanism for a pivotal back rest of a vehicle seat assembly is carried solely by a side arm on the back rest and includes a stop, a gravity biased inertia member pivotally connected to the side arm via an oversized opening and a lock bar pivotally and slidably connected to the side arm and having one end in engagement with the stationary cam on a seat cushion. The inertia member is normally biased in a locking position by the lock bar when the seat back is in its normal upright position. The lock mechanism provides a rapid lock up to prevent pivotal movement of the seat back upon rapid deceleration of the vehicle and in which the lock bar engages the inertia member and moves it against the lock stop to prevent further tilting movement. Due to the oversize pivotal connection between the inertia member and the side arm, only compression loads are exerted against the inertia member with the resultant force being substantially normal to the path or direction of tilting movement of the seat back.

3 Claims, 5 Drawing Sheets

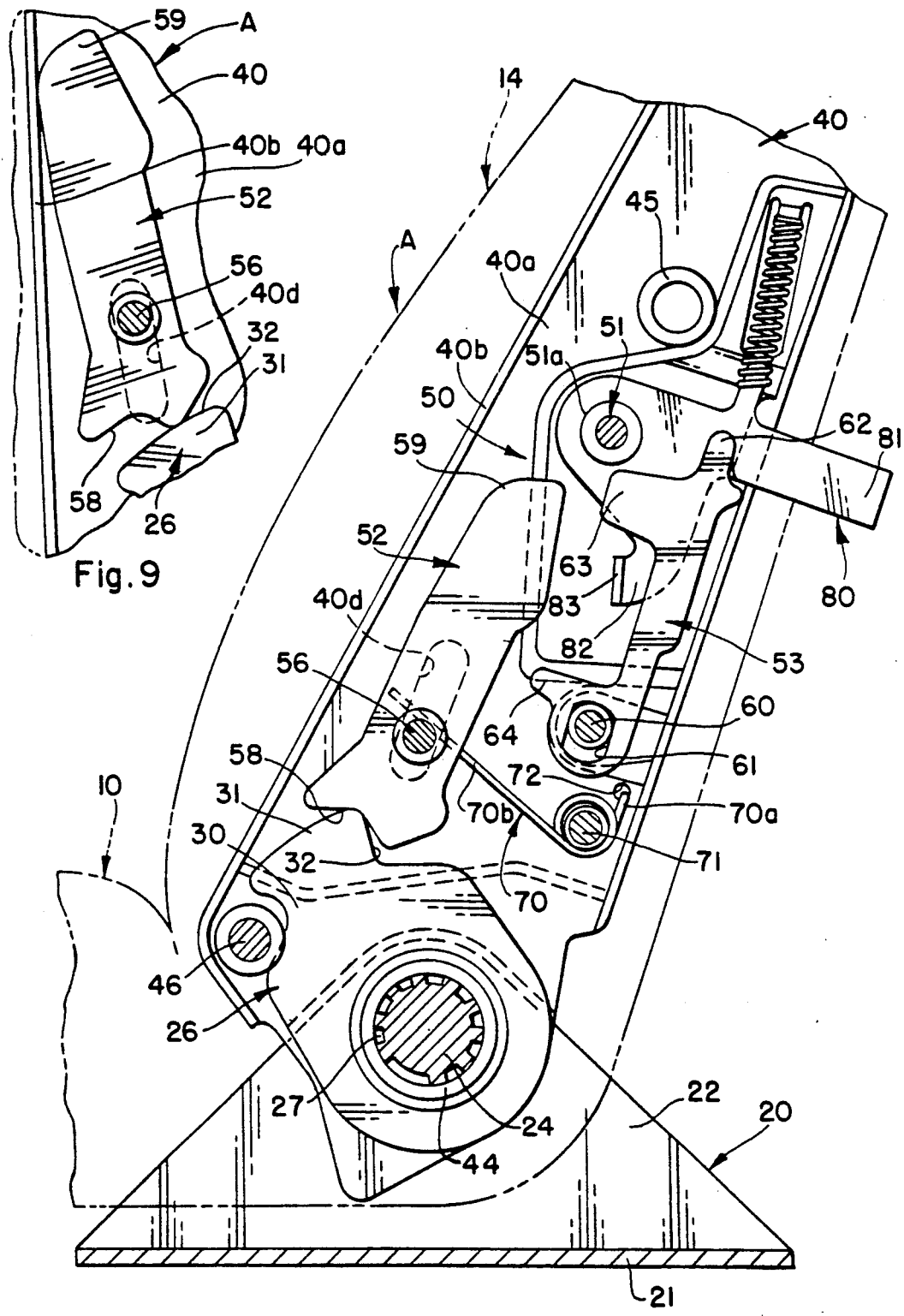

SEAT BACK INERTIA LOCK

The present invention relates to an inertia responsive seat back lock mechanism or lock for a pivotal back rest of a vehicle seat assembly and, more particularly, to an inertia seat back lock which is solely carried by the back rest, normally held in an operative locking position to provide a rapid lock up to prevent further pivotal movement of the seat back upon rapid deceleration of the vehicle and in which only compression loads are exerted against the inertia lock during such lock up.

The present invention provides a novel inertia responsive seat back lock mechanism or lock for a pivotal back rest of a vehicle seat assembly. Pivotal back rests are used in two door or coupe type vehicles in order to forwardly tilt the back rest to permit ingress and egress to and from the back seat of the vehicle.

The inertia seat back lock is carried solely by the side arm on the back rest and comprises a stop spaced upwardly from the seat back pivot of the seat assembly, a lock bar pivotally and slidably connected to the side arm for movement toward and from the stop and having one end in engagement with a stationary cam on the seat cushion and a gravity biased inertia responsive member or pendulum pivotally connected to the side arm via an oversized opening. The inertia member has a first portion normally disposed between the stop and lock bar and a second portion normally in engagement with the lock bar whereby the lock bar holds the inertia member against its gravity bias in a first locking position in which it is poised for rapid lock up when the vehicle experiences rapid deceleration. In the latter event, the lock bar is caused to be moved both pivotally and upwardly to engage the first portion of the inertia member and move the same upwardly into tight engagement with the stop to prevent any further forward movement of the seat back. This inertia responsive lock up is rapid in that it locks up with only 2°-3° of forward pivotal movement of the back rest from its normal upright position. The upward movement of the inertia member against the stop is permitted by virtue of the oversized opening which in turn insures that the forces or loads exerted against the inertia member and other parts of the lock mechanism to be solely in compression and along a line substantially normal to the tilt path of the back rest. This eliminates any tensile loads on the inertia lock member.

Also, the cam, lock bar and inertia member can be planar, relatively thin and can lie in the same plane so that the inertia lock mechanism can be packaged in a thin, compact arrangement at the side of the back rest.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 8 is a view like that shown in FIG. 7, but showing the position of the parts upon further forward tilting of the back rest and with the inertia lock being cleared; and FIG. 9 is a fragmentary view like that shown in FIG. 8, but showing the seat back in its forwardmost tilted position.

Figure 1:
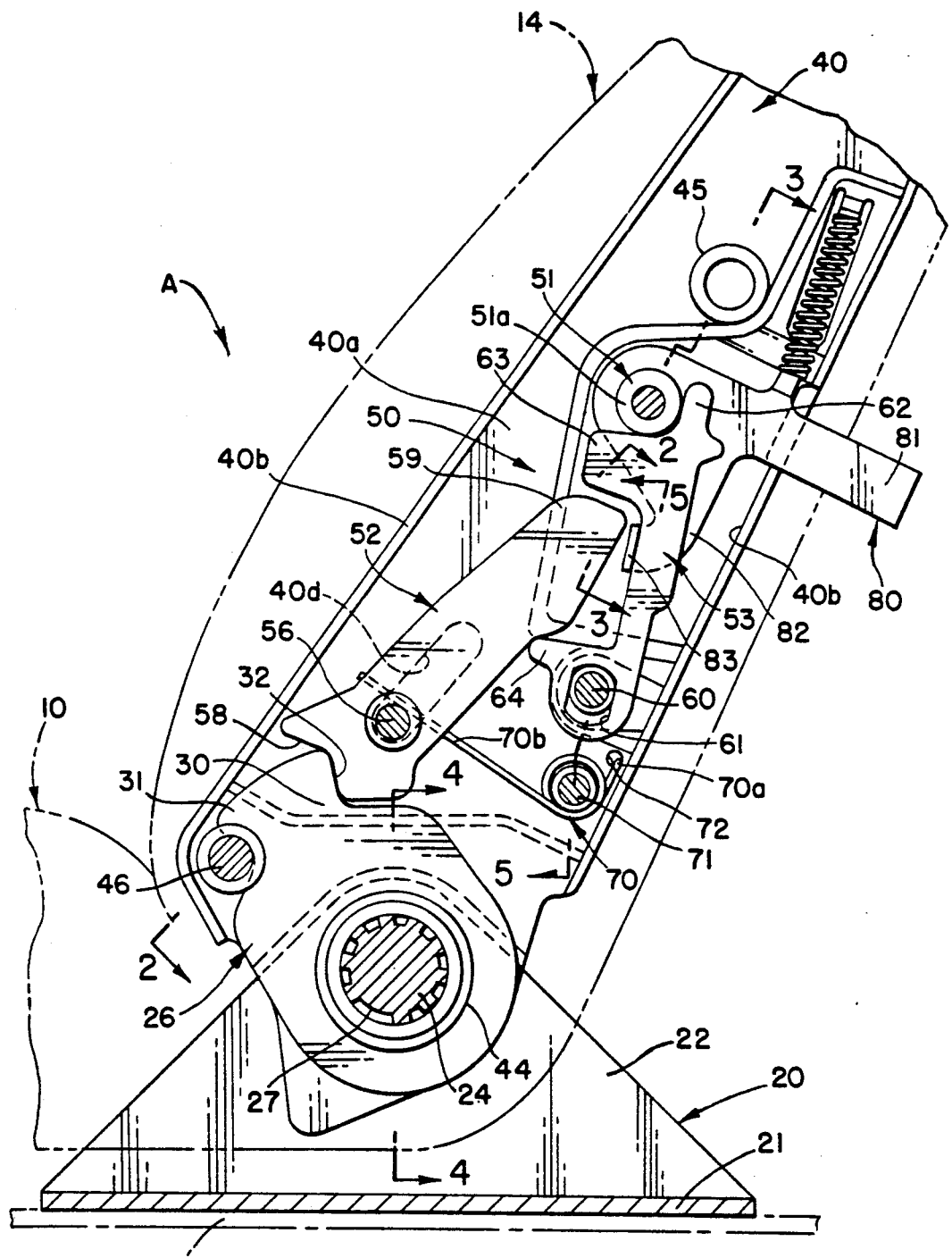
FIG. 1 is a fragmentary side elevational view, with portions shown in section, of a vehicle seat assembly incorporating the novel inertia seat back lock mechanism of the present invention.
Figure 2:
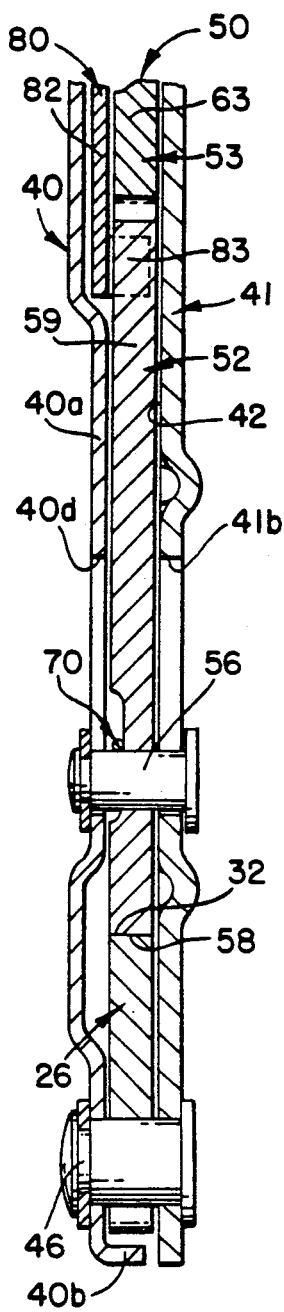
FIG. 2 is a fragmentary sectional view, with portions shown in elevation, taken substantially along the lines 2—2 of FIG. 1.
Figure 3:
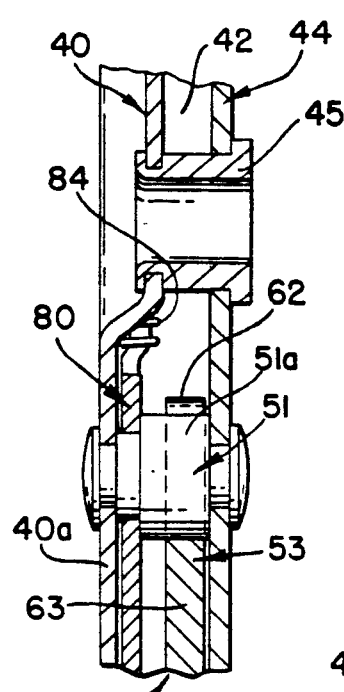
FIG. 3 is a fragmentary sectional view, with portions shown in elevation, taken substantially along the lines 3—3 of FIG. 1.
Figure 5:
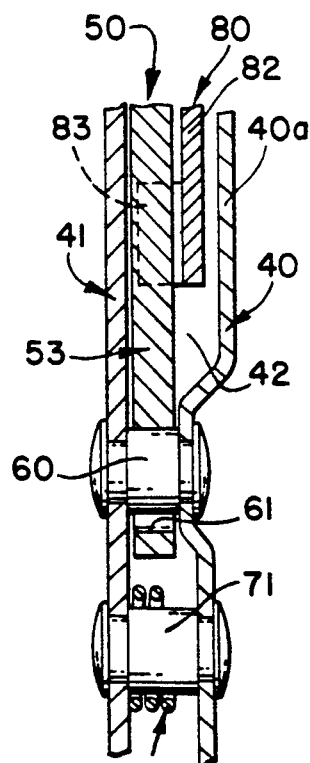
FIG. 5 is a fragmentary sectional view, with portions shown in elevation, taken approximately along line 5—5 of FIG. 1.

Referring to FIG. 1 of the drawings, a novel vehicle seat assembly A is thereshown. The novel seat assembly A comprises a seat cushion or seat cushion unit 10 which is adapted to be supported by the floor 12 of the vehicle and a back rest or back rest unit 14 which is pivotally supported by the seat cushion unit 10 for pivotal movement between a normal upright position, as shown in FIG. 1, and a forward tilted position in which the back rest unit 14 overlies the seat cushion unit 10, as shown in FIG. 9.

Figure 4:
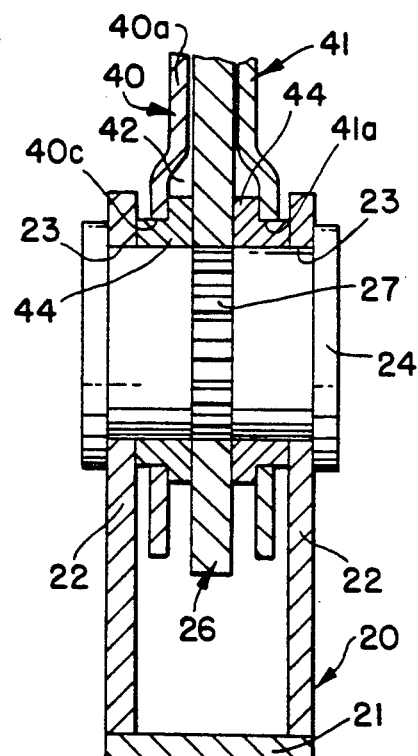
FIG. 4 is a fragmentary sectional view, with portions shown in elevation, taken approximately along line 4—4 of FIG. 1.

The seat cushion unit 10 could be of any suitable or conventional construction and is shown in FIG. 1 as including a stationary side support 20 at each of its sides adjacent its rear end. For brevity, only one of the side supports 20 is shown in the drawings. As best shown in FIGS. 1 and 4, the side support 20 comprises a bottom plate 21 and a pair of spaced upwardly extending triangularly shaped side plates 22. The bottom plate 21 is secured to the vehicle floor 12 and the side plates 22 have aligned openings 23 for receiving a stationary pivot means or pin 24. The pivot means 24 intermediate its ends supports a stationary cam 26. The cam 26 is mounted on the pivot means 24 via a spline connection 27. The cam 26 adjacent its upper left end, as viewed in FIG. 1, includes a neck portion 30 and an enlarged head portion 31. The cam 26, neck and head portions 30, 31, respectively, define a more or less undulated cam surface 32, and for a reason to be hereinafter more fully described.

The back rest unit 14 could be of any suitable or conventional construction and is pivotally supported by the pivot pin means 24 adjacent each of the sides of the seat cushion unit 10. For the sake of brevity, only the one side of the back rest unit 14 shown in the drawings will be described in detail.

As shown in FIGS. 1-5, the back rest unit 14 includes a pair of side arms 40, 41. The side arm 40 is secured to the frame (not shown) of the back rest 14 and includes a generally planar bottom 40a and an inturned peripherally extending flange 40b which extends normal to the planar bottom 40a. The side arm 41 is generally planar and together with the side arm 40 defines a narrow thin compartment 42 therebetween. The arms 40, 41 adjacent their lower ends have aligned openings 40c, 41a which are pivotally mounted on L-shaped bearings 44 carried by the pivot pin means 24. The arms 40, 41 are held spaced apart and interconnected via a hollow bushing 45 and a pivot pin means 46. The pivot pin 46 is located adjacent the lower ends of the arms 40, 41 and is adapted to engage the cam 26 at its neck portion 31 so as to provide a stop for the back rest 14 when in its normal upright position, as shown in FIG. 1.

In accordance with the provisions of the present invention, a novel inertia lock mechanism or lock 50 is provided. The inertia lock mechanism 50 is solely carried by the back rest 14 and located solely within the compartments 42 defined between the arms 40, 41. The inertia lock mechanism 50 comprises essentially three parts. The first is a stop or lock stop 51, a lock bar 52 and an inertia responsive member or pendulum 53. The stop 51 comprises a pivot pin means which is carried by the side arms 40, 41 and has an enlarged intermediate diameter 51a. The lock bar 52 comprises a planar elongated member which is pivotally and slidably connected to the side arms 40, 41. To this end, the side arms are provided with elongated slots 40d, 41b extending upwardly towards the stop 51 and the lock bar 52 carries a pivot 56 which slidably received in the slots 40d and 41b. The lock bar 52 at its lower end has an undulated shape to define a cam follower surface 58 and at its upper end 59 is located beneath the stop 51 when the back rest is in its normal upright position, as shown in FIG. 1. The lock bar 52 is freely pivotal on the pivot pin 56. The lock bar 52 is gravity biased in a clockwise direction, when the seat back 14 is in its normal upright position until its lower end 58 engages the cam follower surface 32 at the lower or innermost end of the neck portion 30 of the cam 26. That is, the lock bar 52 is gravity biased in a clockwise direction, as viewed in FIG. 1, until its lower end engages the cam 26 in a manner to prevent further clockwise pivotal movement.

The inertia responsive member 53 is pivotally connected adjacent its lower end to the side arms 40, 41 by a pivot means 60. The inertia member 53 has an oversized opening or slot 61 to allow for the inertia member 53 to be moved generally vertically toward and from the stop 51 a limited extent, and for a reason to be hereinafter more fully described. The inertia member 53 includes an upper portion 62 which is adapted to engage the stop 51, a first transverse portion 63 which is normally located between the stop 51 and the upper end 59 of the lock bar 52 and a second spaced transverse portion 64 adjacent its pivotal connection 60 which normally engages the lock bar 52. The inertia member 53 has a center of gravity such that is biased for movement about its pivot 60 in a clockwise direction toward the flange 40b of the arm 40, but is normally held in position shown in FIG. 1 by the lock bar 52.

The lock bar 52 is biasingly maintained in engagement with the cam 26 via a spring 70. The spring 70 is pivotally secured on a pivot 71 carried between the side arms 40, 41 and has one end 70a engaged with and hooked through an opening 72 in the side arm 40 and its other end 70b overlying the pivot 56 to maintain the lock bar 52 biased downwardly so that its lower cam follower end 58 engages the cam surface 32 on the cam 26.

The operation of the novel inertia lock mechanism 50 will now be described. When the back rest unit 14 is in its normal upright position, as viewed in FIG. 1, the stop pin 46 will be in engagement with the cam 26 to limit its rearward movement. In this position, the lock bar 52, due to its gravity bias, will be in engagement with the transverse portion 64 of the inertia member 53 and at its lower end in engagement with the cam surface 32. The engagement with the transverse portion 64 of the inertia member 53 causes the inertia member 53 to be rotated in a counterclockwise direction and held in opposition to its normal gravity bias until the top portion 62 engages the pivot or stop 51. In this position, the upper transverse portion 63 of the inertia member 53 will be located between the upper end 59 of the lock bar 52 and the stop 51.

Figure 6:
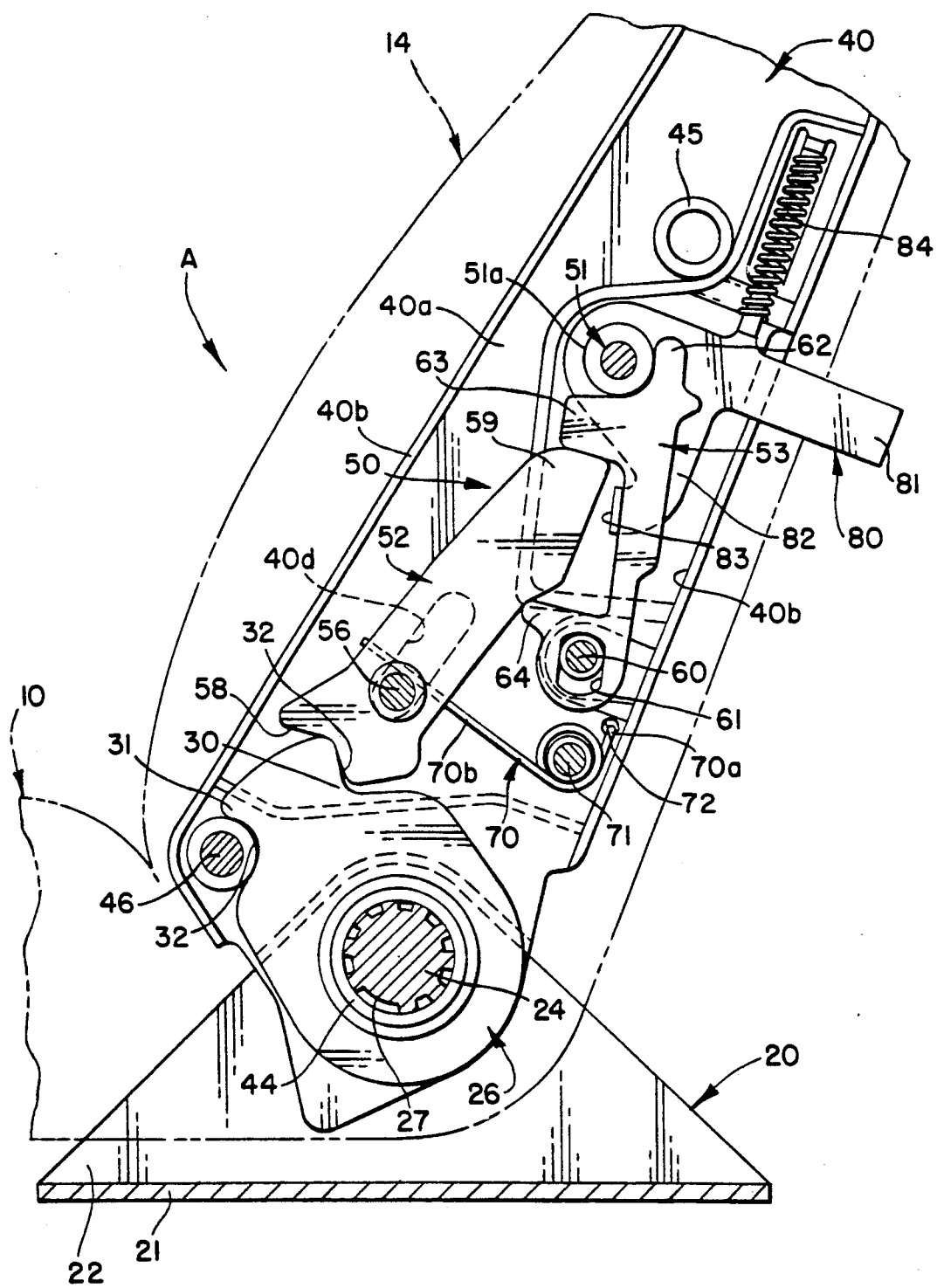
FIG. 6 is a view like that shown in FIG. 1, but showing the relative position of the parts when the seat back is locked against forward tilting movement upon rapid deceleration of the vehicle.

The inertia lock mechanism 50 is operable to prevent the back rest unit 14 from being pivoted forwardly toward its forward tilted position when the vehicle is subjected to a deceleration force in excess of a predetermined magnitude. When such a deceleration force exists, the parts of the inertia lock mechanism will assume the position shown in FIG. 6. When this event occurs, the inertia member 53 remains in the position shown in FIGS. 1 and 6 due to the inertia forces acting thereon. The lock bar 53, however, due to the inertia forces acting thereon, will tend to pivot in a counterclockwise direction about its pivot 56. As the lock bar 52 pivots about its pivot 56, the cam follower end 58, due to its engagement with the cam 26, will cause the lock bar 52 to be also moved upwardly toward the stop 51. As a result of this movement, the lock bar 52 will engage the transverse portion 63 on the inertia member 53 and move the inertia member 53 upwardly into tight engagement with the stop 51 and thus, prevent further forward tilting movement of the seat back unit 14.

It should be noted that the inertia lock mechanism 50 will lock the back rest 14 against forward tilting movement within about 2°-3° of forward pivotal movement of the back rest. It should also be noted that the forces applied to the inertia member 53 by the cam 26, lock bar 52 and stop 51 are in compression and along a line substantially normal to the direction of forward tilting movement of the back rest 14. Thus, no tensile loads are placed on the inertia lock member 53 and mechanism 50. This is achieved due to the slot 61 permitting the inertia member 53 to be moved toward and from the lock stop 51 a limited amount and thus ensures that the loads placed on the inertia member 53 are always solely in compression.

Figure 7:
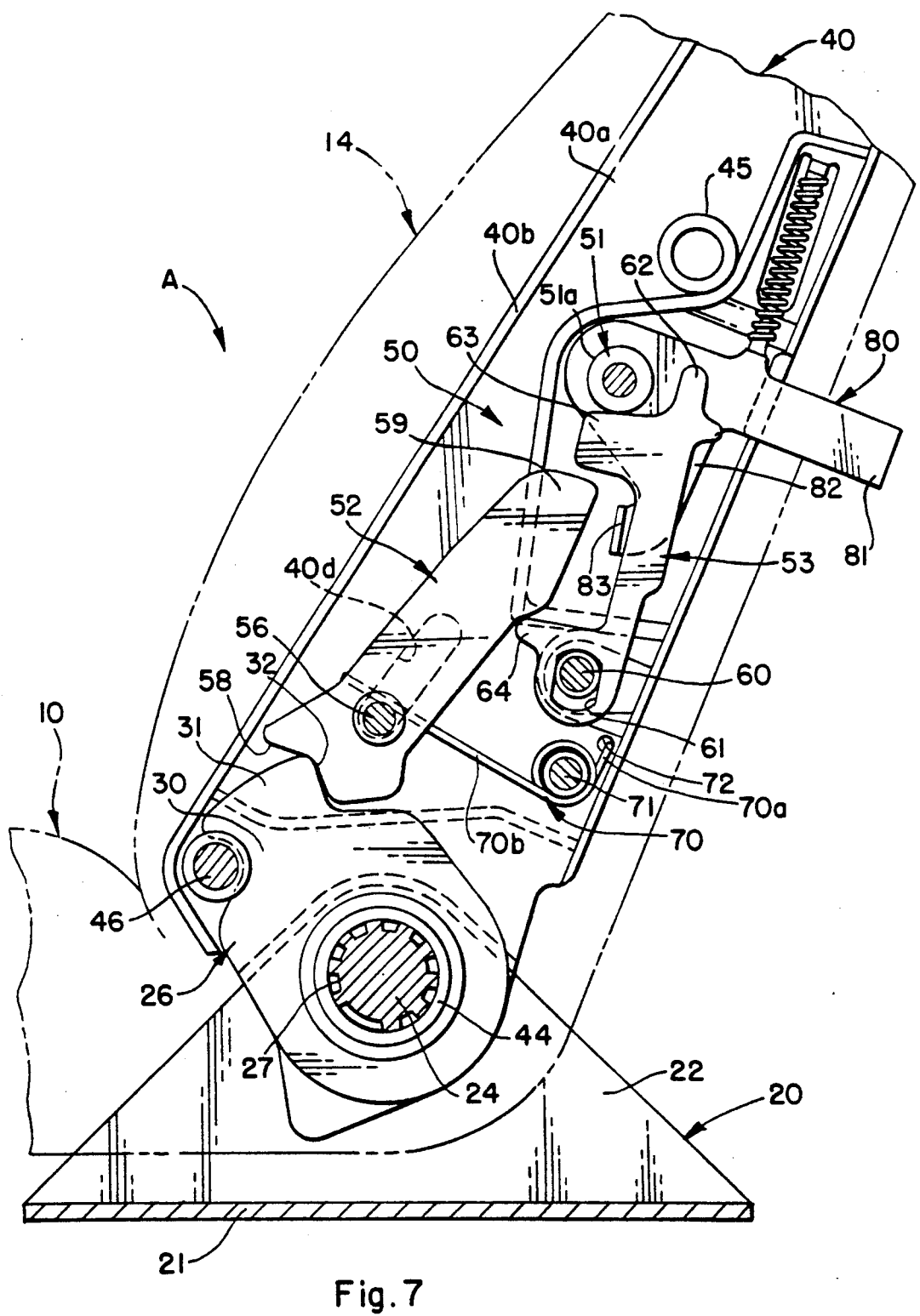
FIG. 7 is a view like that shown in FIG. 1, but showing the position of the parts on the initial slow forward tilting movement of the back rest.

The inertia lock mechanism 50 also allows the back rest unit 14 to be slowly forwardly tilted towards its forward tilted position in which it overlies the seat cushion unit 10. As best shown in FIGS. 7-9, when the back rest 14 is slowly tilted forwardly, the lock bar 52 is moved in a counterclockwise direction with the seat cushion unit 14. As the lock bar 52 moves in a counterclockwise direction, the inertia lock member 53 is allowed to pivot clockwise about its pivot 60 toward the peripheral back side of the flange 40b of the arm 40. This movement takes place due to the gravity bias of the inertia member 53. This allows the transverse portion 63 to be withdrawn from the space between the end 59 of the lock bar 52 and the stop 51. Further forward tilting movement of the back rest unit 14 causes the lock bar 52 to follow the contour of the cam 26 and cause further movement of the lock bar 52 in the counterclockwise direction even though it is also slightly moving upwardly toward the lock stop 51. The contour of the cam 26 and the cam follower portion 58 and the dimensions of the lock bar 52 and the inertia member 53 are such that the upper end of the lock bar 59 and the transverse portion 63 do not engage each other when the back rest 14 is slowly tilted forwardly. Note that the inertia member 53, when it disengages from the lock bar 52, as shown in FIG. 8, will, due to its gravity bias, engage the peripheral flange 40b of the side arm 40. When the back rest 14 is tilted over its top dead center position, the lock bar 52 due to its gravity bias will be moved further counterclockwise until it engages the peripheral flange 40d of the front side of the side arm 40, as shown in FIG. 9, and with the pivot 56 merely riding upwardly along the slots 40d and 41b.

When the back rest 14 is returned towards its normal upright position, the parts of the inertia lock mechanism 50 will have the reverse movements and with the lock bar 52 again engaging the transverse portion 64 of the inertia member 53 to move the same counterclockwise about its pivot 60 and in opposition to its gravity bias to again position the transverse portion 63 between the lock bar 52 and the stop 51. The advantage of always having the inertia member 53 in an operative position to lock up is that when a rapid deceleration condition exists, the lock mechanism becomes operative with only minimal amount of pivotal movement of the back rest 14.

It should be noted that these inertia lock mechanisms are particularly useful for pivotal back rests for coupe-type automobiles or two-door vehicles having back seats so that the back rest can be tilted forward to permit ingress and egress of passengers into the back seat area.

It should also be noted that another advantage of the novel inertia lock mechanism 50 of the present invention is that the cam 26, the lock bar 52 and the inertia latch 53 can all be planar, thin members and lie in the same plane so as to be packagable within the small transverse space, as shown by the small transverse width of the compartment 42 between the arms 40, 41.

The inertia lock mechanism 50 also includes a release lever 80 should the vehicle or back rest 14 have an attitude which would require the use of the release lever 80. The release lever 80 comprises a planar member which is pivotally secured to the stop means 51 and which has a first leg which extends rearwardly of the back rest to provide a handle portion 81 and a second leg 82 with an outwardly extending flange 83 for engagement with the inertia member 53 should the need arise. The lever 80 would normally be biased to a position, as shown in FIG. 1, where it does not interfere with the normal operation of the inertia member 53 by a spring 84. If for some reason the inertial member 53 were in its locked position and the lock bar was not able to return towards its normal upright position, the release lever 80 could be raised to move the inertia member 53 to its inoperative position.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a seat assembly for an automotive vehicle comprising:

a seat cushion unit and a back rest unit including a side arm pivotally connected via a pivot means to said seat cushion unit for movement between a normal upright position and a forward tilted position in which the side arm and back rest unit overlie the seat cushion unit, said seat cushion unit having a cam, and an inertia lock mechanism carried by said arm of said back rest unit and operatively associated with said cam, said inertia lock mechanism being operable to permit slow forward tilting movement of said seat back unit from its upright position toward its forward position, but locking up and preventing forward tilting movement of said seat back unit when the vehicle is subjected to a deceleration force in excess of a predetermined magnitude, the improvement being that said inertia lock mechanism is carried solely by said side arm and comprises a lock stop carried by said side arm at a location spaced upwardly from said pivot means, a lock bar pivotally and slidably connected to said side arm for movement toward and from said lock stop and having a lower end which engages said cam, and an inertia responsive member pivotally connected to said side arm via an oversize opening in said member to permit limited movement of said member toward and from said lock stop, said inertia member being pivotally movable between first and second positions, said inertia member when in said first position having a first transverse portion thereof disposed between said lock bar and said lock stop and a second transverse portion spaced from said first transverse portion engaging said lock bar intermediate its ends, said inertia member when in its second position engaging a stop surface on said side arm and having its first transverse portion not located between said lock stop and said lock bar, said inertia member being gravity biased for movement in a first direction toward said second position, but being held in its first position in which said first transverse portion is disposed between said lock bar and lock stop by said lock bar when the seat back unit is in its upright position, said inertia member remaining in said first position and said lock bar being caused to move toward said lock stop by said cam and engage and move said first transverse portion upwardly against said lock stop to lock said back rest unit against further forward tilting movement in response to the vehicle being subjected to deceleration forces in excess of a predetermined magnitude, said engagement of said first transverse portion by said lock bar and lock stop placing only a compression force on said inertia member due to the oversize opening in said inertia member permitting limited movement toward and from said lock stop, said inertia member due to its gravity bias moving from its first position toward its second position in response to the arm and lock bar of the back rest unit being slowly pivoted toward a forward tilted position to allow the lock bar to clear the first transverse portion of said inertia member.

2. In a seat assembly for an automotive vehicle comprising:

a seat cushion unit and a back rest unit including a side arm pivotally connected via a pivot means to said seat cushion unit for movement between a normal upright position and a forward tilted position in which the side arm and back rest unit overlie the seat cushion unit, said seat cushion unit having a cam, and an inertia lock mechanism carried by said arm of said back rest unit and operatively associated with said cam, said inertia lock mechanism being operable to permit slow forward tilting movement of said seat back unit from its upright position toward its forward position, but locking up and preventing forward tilting movement of said seat back unit when the vehicle is subjected to a deceleration force in excess of a predetermined magnitude, the improvement being that said inertia lock mechanism is carried solely by said side arm and comprises a lock stop carried by said side arm at a location spaced upwardly from said pivot means, a lock bar pivotally and slidably connected to said side arm for movement toward and from said lock stop and having a lower undulated cam follower end which engages said cam, and an inertia responsive member pivotally connected to said side arm via an oversize opening in said member to also permit limited movement of said member toward and from said lock stop, said inertia member being pivotally movable between first and second positions, said lock bar being gravity biased toward and held in a first position due to its engagement with the cam and its pivotal connection to the arm when the back rest is in its upright position, said inertia member when in said first position having a first transverse portion thereof disposed between said lock bar and said lock stop and a second transverse portion spaced from said first transverse portion engaging said lock bar intermediate its ends, said inertia member when in its second position engaging a stop surface on said arm and having its first transverse portion not located between said lock stop and said lock bar, said inertia member being gravity biased for movement in a first direction toward said second position, but being held in its first position in which said first transverse portion is disposed between said lock bar and lock stop by said lock bar when the lock bar is in its first position and said seat back unit is in its upright position, said inertia member remaining in said first position and said lock bar being caused to move toward said lock stop by said cam and engage and move said first transverse portion upwardly against said lock stop to lock said back rest unit against further forward tilting movement in response to the vehicle being subjected to deceleration forces in excess of a predetermined magnitude, said engagement of said first transverse portion by said lock bar and lock stop placing only a compression force on said first transverse portion of said inertia member and in a direction substantially normal to the tilt path of said back rest unit due to the oversize opening in said inertia member permitting limited movement toward and from said lock stop, said inertia member due to its gravity bias moving from its first position toward its second position in response to the arm and lock bar of the back rest unit being slowly pivoted toward a forward tilted position to allow the lock bar to clear the first transverse portion of said inertia member.

3. In a seat assembly, as defined in claim 2, and wherein said cam, lock bar and inertia member are planar and lie in the same plane so that said inertia lock mechanism has a thin width.

* * * * *